United States Patent
Liu et al.

(10) Patent No.: US 11,290,963 B2
(45) Date of Patent: Mar. 29, 2022

(54) INFORMATION SENDING METHOD, RECEIVE POWER MEASUREMENT METHOD, DEVICE, AND SYSTEM

(71) Applicant: Huawei Technologies Co., Ltd., Shenzhen (CN)

(72) Inventors: Hengjin Liu, Shenzhen (CN); Qiming Li, Shenzhen (CN); Zhe Jin, Beijing (CN); Zhe Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/663,741

(22) Filed: Oct. 25, 2019

(65) Prior Publication Data

US 2020/0059872 A1 Feb. 20, 2020

Related U.S. Application Data

(63) Continuation of application No. PCT/CN2017/082554, filed on Apr. 28, 2017.

(51) Int. Cl.
*H04W 24/06* (2009.01)
*H04W 52/24* (2009.01)
(Continued)

(52) U.S. Cl.
CPC ........ *H04W 52/245* (2013.01); *H04B 17/327* (2015.01); *H04L 5/0048* (2013.01);
(Continued)

(58) Field of Classification Search
CPC . H04W 52/245; H04W 52/325; H04W 24/06; H04W 24/08; H04W 24/10;
(Continued)

(56) References Cited

U.S. PATENT DOCUMENTS 10,098,120 B2 * 10/2018 Alvarino ............... H04L 5/0053
10,200,895 B2 * 2/2019 Kaikkonen ........... H04W 24/10
(Continued)

FOREIGN PATENT DOCUMENTS

| CN | 102461023 A | 5/2012 |
|---|---|---|
| CN | 102572927 A | 7/2012 |

(Continued)

OTHER PUBLICATIONS

"3rd Generation Partnership Project; Technical Specification Group Radio Access Network; Evolved Universal Terrestrial Radio Access (E-UTRA); Physical layer; Measurements (Release 14)," 3GPP TS 36.214 V14.2.0, Mar. 2017, 22 pages.
(Continued)

*Primary Examiner* — Hai V Nguyen
(74) *Attorney, Agent, or Firm* — Slater Matsil, LLP

(57) ABSTRACT

An information sending method, including obtaining, by a network device, first indication information, where the first indication information indicates a magnitude relationship between a transmit power of a first signal received by a terminal device and a transmit power of a reference signal received by the terminal device, and the first signal is a synchronization signal, and sending the first indication information from the network device to the terminal device.

20 Claims, 5 Drawing Sheets

(51) Int. Cl.
*H04B 17/327* (2015.01)
*H04L 5/00* (2006.01)
*H04W 24/08* (2009.01)
*H04W 24/10* (2009.01)
*H04W 48/10* (2009.01)
*H04W 52/32* (2009.01)

(52) U.S. Cl.
CPC .......... *H04W 24/06* (2013.01); *H04W 24/08* (2013.01); *H04W 24/10* (2013.01); *H04W 48/10* (2013.01); *H04W 52/325* (2013.01)

(58) Field of Classification Search
CPC ..... H04W 48/10; H04W 52/34; H04W 24/02; H04W 56/003; H04B 17/327; H04B 17/00; H04B 17/318; H04B 17/345; H04B 17/3913; H04L 5/0048; H04L 5/0035; H04L 5/0053; H04L 5/0094; H04L 5/0096; H04L 25/0202; H04L 25/0224; H04J 11/0036; H04J 11/005
USPC .................................................. 455/522, 69
See application file for complete search history.

(56) References Cited

U.S. PATENT DOCUMENTS

| | | | |
|---|---|---|---|
| 10,476,567 B2* | 11/2019 | Wernersson | H04L 5/0048 |
| 10,484,950 B1* | 11/2019 | Gong | H04W 52/18 |
| 10,524,244 B2* | 12/2019 | Tsai | H04W 72/042 |
| 10,715,951 B1* | 7/2020 | Ratasuk | G01S 5/0252 |
| 10,812,240 B2* | 10/2020 | Nader | H04W 24/08 |
| 10,892,929 B2* | 1/2021 | Sorrentino | H04B 7/0891 |
| 10,897,790 B2* | 1/2021 | Velev | H04W 8/24 |
| 10,903,886 B2* | 1/2021 | Faxer | H04B 7/0486 |
| 10,917,150 B2* | 2/2021 | Lee | H04B 7/0456 |
| 10,917,917 B2* | 2/2021 | Kazmi | H04W 24/10 |
| 10,925,046 B2* | 2/2021 | Maaref | H04L 5/0048 |
| 10,938,609 B2* | 3/2021 | Kazmi | H04L 5/001 |
| 10,986,661 B2* | 4/2021 | Basu Mallick | H04L 5/008 |
| 11,019,571 B2* | 5/2021 | Wernersson | H04B 7/0617 |
| 11,051,293 B2* | 6/2021 | Tsai | H04W 72/0446 |
| 11,082,182 B2* | 8/2021 | Ko | H04W 72/0446 |
| 11,166,307 B2* | 11/2021 | Basu Mallick | H04L 5/0055 |
| 2007/0297324 A1* | 12/2007 | Lindoff | H04L 27/2684 370/210 |
| 2010/0309797 A1 | 12/2010 | Lindoff et al. | |
| 2015/0043369 A1* | 2/2015 | Kim | H04W 24/08 370/252 |
| 2015/0078257 A1* | 3/2015 | Wu | H04J 11/0036 370/328 |
| 2015/0155996 A1* | 6/2015 | Garcia | H04W 72/082 370/329 |
| 2015/0264592 A1* | 9/2015 | Novlan | H04W 52/0206 370/252 |
| 2015/0372779 A1* | 12/2015 | Lim | H04W 56/003 370/338 |
| 2016/0021602 A1 | 1/2016 | Li | |
| 2017/0064576 A1 | 3/2017 | Kusashima et al. | |
| 2017/0118720 A1 | 4/2017 | Liu | |
| 2017/0208591 A1* | 7/2017 | Rico Alvarino | H04W 4/70 |
| 2017/0230780 A1* | 8/2017 | Chincholi | H04L 1/0046 |
| 2017/0332359 A1* | 11/2017 | Tsai | H04W 72/0446 |
| 2018/0049053 A1* | 2/2018 | Kaikkonen | H04W 24/10 |
| 2019/0115964 A1* | 4/2019 | Yum | H04B 7/0632 |
| 2019/0199420 A1* | 6/2019 | Faxer | H04B 7/0632 |
| 2019/0274150 A1* | 9/2019 | Huang | H04W 52/265 |
| 2019/0312617 A1* | 10/2019 | Wernersson | H04L 25/0226 |
| 2019/0319764 A1* | 10/2019 | Nader | H04L 5/0091 |
| 2019/0342132 A1* | 11/2019 | Kazmi | H04L 27/26025 |
| 2019/0364601 A1* | 11/2019 | Kazmi | H04W 16/26 |
| 2020/0022160 A1* | 1/2020 | Zou | H04W 72/1242 |
| 2020/0044706 A1* | 2/2020 | Wernersson | H04W 52/42 |
| 2020/0045767 A1* | 2/2020 | Velev | H04W 76/27 |
| 2020/0084754 A1* | 3/2020 | Tsai | H04W 72/0446 |
| 2020/0204318 A1* | 6/2020 | Thangarasa | H04J 11/0086 |
| 2020/0229177 A1* | 7/2020 | Zou | H04W 72/0413 |
| 2020/0252255 A1* | 8/2020 | Sorrentino | H04B 7/068 |
| 2020/0314955 A1* | 10/2020 | Velev | H04W 52/0216 |
| 2020/0329503 A1* | 10/2020 | Da Silva | H04W 72/08 |
| 2020/0337107 A1* | 10/2020 | Mildh | H04W 40/34 |
| 2020/0367172 A1* | 11/2020 | Wernersson | H04W 52/221 |
| 2020/0367234 A1* | 11/2020 | Bergstrom | H04L 5/0005 |
| 2020/0382177 A1* | 12/2020 | Lee | H04L 25/03343 |
| 2020/0389883 A1* | 12/2020 | Faxer | H04L 5/0048 |
| 2020/0396632 A1* | 12/2020 | Ramachandra | H04L 41/0806 |
| 2021/0068075 A1* | 3/2021 | Uesaka | H04L 1/08 |
| 2021/0083743 A1* | 3/2021 | Faxer | H04B 7/0639 |
| 2021/0092687 A1* | 3/2021 | Harrison | H04L 25/0226 |
| 2021/0120462 A1* | 4/2021 | Chen | H04W 8/26 |
| 2021/0127354 A1* | 4/2021 | Rune | H04L 61/6054 |
| 2021/0136694 A1* | 5/2021 | Gao | H04W 52/08 |
| 2021/0153114 A1* | 5/2021 | Lindheimer | H04W 48/02 |
| 2021/0185652 A1* | 6/2021 | Rune | H04W 72/042 |
| 2021/0289445 A1* | 9/2021 | Muruganathan | H04W 52/08 |
| 2021/0329553 A1* | 10/2021 | Strom | H04W 52/0212 |

FOREIGN PATENT DOCUMENTS

| | | |
|---|---|---|
| CN | 102958147 A | 3/2013 |
| CN | 104080119 A | 10/2014 |
| CN | 105916172 A | 8/2016 |
| WO | 2013113988 A1 | 8/2013 |
| WO | 2017045205 A1 | 3/2017 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 14)," 3GPP TS 36.101 V14.3.0 , Mar. 2017, 1369 pages.

"3rd Generation Partnership Project; Technical Specification Group Radio Access Network; Evolved Universal Terrestrial Radio Access (E-UTRA); Requirements for support of radio resource management (Release 14)," 3GPP TS 36.133 V14.3.0 , Mar. 2017, 2387 pages.

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0 , Mar. 2017, 196 pages.

"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, Mar. 2017, 454 pages.

"3rd Generation Partnership Project; Technical Specification Group Radio Access Network; Evolved Universal Terrestrial Radio Access (E-UTRA); User Equipment (UE) procedures in Idle mode (Release 14)," 3GPP TS 36.304 V14.2.0, Mar. 2017, 49 pages.

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2 , Apr. 2017, 721 pages.

"New WID on Further NB-IoT Enhancements," Source: Huawei, HiSilicon, Neul, Document for: Approval, Agenda Item: 10.11, #3GPP TSG RAN Meeting #75, RP-170852, Dubrovnik, Croatia, Mar. 6-9, 2017, 6 pages.

"On Narrowband Measurement Accuracy Improvement," Agenda Item: 7.2.7.2, Source: Huawei, HiSilicon, Document for: Discussion and Decision, 3GPP TSG RAN WG1 Meeting #88bis, R1-1705120, Apr. 3-7, 2017, 4 pages.

"WF on Assistant Information for RRM Measurement Enhancement," Agenda Item: 7.2.7.2, LG Electronics, 3GPP TSG RAN WG1 Meeting #88bis, R1-1706618, Apr. 3-7, 2017, 3 pages.

"Remaining Issues on NB-RS for NB-IoT," Source: ZTE, Agenda Item: 2.2.6, Document for: Discussion and Decision, 3GPP TSG RAN WG1 NB-ioT Ad-Hoc Meeting, R1-161864, Mar. 22-24, 2016, 4 pages.

(56) References Cited

OTHER PUBLICATIONS

LG Electronics, "RRM measurement enhancement in NB-IoT", 3GPP TSG RAN WG1 #88bis, R1-1704849, Apr. 3-7, 2017, 3 pages, Spokane, USA.

* cited by examiner

INFORMATION SENDING METHOD, RECEIVE POWER MEASUREMENT METHOD, DEVICE, AND SYSTEM

CROSS-REFERENCE TO RELATED APPLICATIONS

This application is a continuation of International Application No. PCT/CN2017/082554, filed on Apr. 28, 2017, the disclosure of which is hereby incorporated by reference in its entirety.

TECHNICAL FIELD

This application relates to the field of wireless communications technologies, and in particular, to an information sending method, a receive power measurement method, a device, and a system.

BACKGROUND

In a long term evolution (LTE) system, a reference signal received power (RSRP) is measured based on a cell-specific reference signal (CRS), and is mainly used for cell selection, cell reselection, and uplink power control. A basic principle of measuring the RSRP is as follows. A base station sends a CRS to a terminal device, and after receiving the CRS, the terminal device determines a signal received power on each of resource elements (RE) that carry the CRS, and uses, as the RSRP, an average of the signal received powers on all the REs that carry the CRS. In the LTE system, there is a relatively large quantity of REs that carry the CRS. Therefore, precision of measuring the RSRP by the terminal device based on the CRS is relatively high, so that the terminal device can make a relatively accurate selection based on the RSRP.

A bandwidth in a narrowband internet of things (NB-IoT) system is smaller than a bandwidth in the LTE system. Therefore, in the NB-IoT system, the RSRP is referred to as a narrowband reference signal received power (NRSRP). Currently, the NRSRP is measured based on a narrowband reference signal (NRS). Specifically, a base station sends an NRS to a terminal device, and the terminal device receives the NRS, determines a signal received power on each of REs that carry the NRS, and uses, as the NRSRP, an average of the signal received powers on all the REs that carry the NRS. There is a relatively small quantity of REs that carry the NRS. Therefore, in the NB-IoT system, precision of obtaining the NRSRP through measurement based only on the NRS is relatively poor. Consequently, a signal strength of a cell cannot be accurately measured, and signal transmission quality in a communication process is affected.

SUMMARY

Embodiments of this application provide an information sending method, a receive power measurement method, a device, and a system, to help improve signal transmission quality in a communication process.

According to a first aspect, an indication information sending method is provided, and includes obtaining, by a network device, first indication information, and sending the first indication information to a terminal device, where the first indication information is used to indicate a magnitude relationship between a transmit power of a first signal and a transmit power of a reference signal, or the first indication information is used to indicate the transmit power of the first signal, and the first signal is at least one of a synchronization signal, a positioning reference signal, and a broadcast signal.

The network device may send the first indication information to the terminal device. Therefore, the terminal device may obtain a first receive power based on the first indication information, a receive power of the first signal, and a receive power of the reference signal. A signal strength of a cell that is measured by using the first receive power is more accurate than that measured in the prior art, so that the terminal device can make a correct selection, thereby helping improve signal transmission quality in a communication process.

According to the first aspect, in a possible design, the first signal and the reference signal are signals of a serving cell, and the first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

It should be understood that, in this embodiment of this application, the serving cell is a cell in which the terminal device is currently located, to be specific, a cell that currently serves the terminal device.

For example, the first index number corresponds to a ratio of the receive power of the first signal to the receive power of the reference signal. For example, when the ratio of the receive power of the first signal to the receive power of the reference signal is 1.2, the corresponding index number is 5. A correspondence between an index number and a ratio may be pre-configured in the terminal device and the network device. In addition, a table of the correspondence between an index number and a ratio may be alternatively pre-configured in the network device, and is delivered by the network device to the terminal device, provided that the network device and the terminal device use a same correspondence table. A specific implementation is not limited herein. When the first indication information is a difference between the receive power of the first signal and the receive power of the reference signal, a case is similar, and details are not described herein again.

According to the first aspect, in a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

The first indication information sent to the terminal device indicates the ratio of the transmit power of the first signal in the adjacent cell to the transmit power of the reference signal in the adjacent cell or the difference between the transmit power of the first signal in the adjacent cell and the transmit power of the reference signal in the adjacent cell, and the first indication information is sent by a network device in a serving cell to the terminal device. Therefore, a case in which the terminal device cannot directly obtain the first indication information from the adjacent cell when a signal in the serving cell relatively greatly interferes with a signal in the adjacent cell is avoided, and power consumption of the terminal device is reduced.

According to the first aspect, in a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

When the first parameter value is the first index number, and the second parameter value is the second index number, if the first index number and the second index number both correspond to a value of $$\frac{W_1}{W_2},$$

where $W_1$ is the receive power of the first signal, and $W_2$ is the receive power of the reference signal, the first index number and the second index number may share one index table.

According to the first aspect, in a possible design, the network device sends second indication information to the terminal device, where the second indication information is used to indicate whether the first parameter value is the same as the second parameter value.

The network device sends the second indication information to the terminal device. After receiving the second indication information, the terminal device may directly obtain a first receive power of the adjacent cell based on the first parameter value after determining that the first parameter value is the same as the second parameter value, and the second parameter value does not need to be obtained through decoding. Usually, it is relatively simple to encode the second indication information, thereby helping simplify a manner of measuring the first receive power of the adjacent cell.

According to a second aspect, a receive power measurement method is provided, and includes receiving, by a terminal device, first indication information sent by a network device, and determining a first receive power based on the first indication information, a receive power of the first signal, and a receive power of the reference signal, where the first indication information is used to indicate a magnitude relationship between a transmit power of the first signal and a transmit power of the reference signal, or the first indication information is used to indicate the transmit power of the first signal, and the first signal is at least one of a synchronization signal, a positioning reference signal, and a broadcast signal.

It should be understood that, when the first signal and a parameter signal belong to a same cell, the first receive power is used to indicate a signal strength of the cell.

The terminal device may obtain the first receive power based on the first indication information, the receive power of the first signal, and the receive power of the reference signal, and a signal strength of a cell that is measured by using the first receive power is more accurate than that measured in the prior art, so that the terminal device can make a correct selection based on the first receive power, thereby helping improve signal transmission quality in a communication process.

According to the second aspect, in a possible design, the first signal and the reference signal are signals of a serving cell.

The first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

It should be understood that, in this embodiment of this application, the serving cell is a cell in which the terminal device is currently located, to be specific, a cell that currently serves the terminal device.

For example, the first index number corresponds to a ratio of the receive power of the first signal to the receive power of the reference signal. For example, when the ratio of the receive power of the first signal to the receive power of the reference signal is 1.5, the corresponding index number is 2. A table of a correspondence between an index number and a ratio may be pre-configured in the terminal device and the network device. In addition, the table of the correspondence between an index number and a ratio may be alternatively pre-configured in the network device, and is delivered by the network device to the terminal device, provided that the network device and the terminal device use a same correspondence table. A specific implementation is not limited herein. When the first indication information is a difference between the receive power of the first signal and the receive power of the reference signal, a case is similar, and details are not described herein again.

According to the second aspect, in a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

The first indication information indicates the ratio of the transmit power of the first signal in the adjacent cell to the transmit power of the reference signal in the adjacent cell or the difference between the transmit power of the first signal in the adjacent cell and the transmit power of the reference signal in the adjacent cell, and the first indication information is sent by a network device in a serving cell to the terminal device. Therefore, a case in which the terminal device cannot directly obtain the first indication information from the adjacent cell when a signal in the serving cell relatively greatly interferes with a signal in the adjacent cell is avoided, and power consumption of the terminal device is reduced.

According to the second aspect, in a possible design, the first receive power is a linear average of the receive power of the first signal and the receive power of the reference signal.

According to the second aspect, in a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

According to the second aspect, in a possible design, the terminal device receives second indication information sent by the network device, where the second indication information is used to indicate whether the first parameter value is the same as the second parameter value.

The terminal device determines a first receive power of the serving cell based on the first parameter value in the first indication information, and a receive power of the first signal and a receive power of the reference signal that are in the serving cell, and when the second indication information indicates that the first parameter value is the same as the second parameter value, determines a first receive power of the adjacent cell based on the first parameter value, and a receive power of the first signal and a receive power of the reference signal that are in the adjacent cell, or when the second indication information indicates that the first parameter value is different from the second parameter value, determines the first receive power of the adjacent cell based on the second parameter value, and the receive power of the first signal and the receive power of the reference signal that are in the adjacent cell.

After determining, according to the second indication information, that the first parameter value is the same as the second parameter value, the terminal device may directly obtain the first receive power of the adjacent cell based on the first parameter value, and the second parameter value does not need to be obtained through decoding. Usually, it is relatively simple to encode the second indication information, thereby helping simplify a manner of measuring the first receive power of the adjacent cell.

According to a third aspect, an information sending method is provided, and includes determining, by a network device, first indication information, and sending the first indication information to a terminal device, where the first indication information is used to indicate a measurement manner of a first receive power to the terminal device, and the first receive power is used to indicate a signal strength of a cell.

The network device may indicate the measurement manner of the first receive power to the terminal device, thereby helping the terminal device more accurately measure the signal strength of the cell.

According to the third aspect, in a possible design, to improve flexibility of measuring the first signal received power by the terminal device, the measurement manner of the first receive power may include measurement based on a reference signal, measurement based on a reference signal and a first signal, and measurement based on a first signal. The first signal is at least one of a synchronization signal, a positioning reference signal, and a broadcast signal.

For example, during the measurement based on the reference signal, a receive power of the reference signal is used as the first receive power, during the measurement based on the reference signal and the first signal, the first receive power is determined based on a receive power of the reference signal and a receive power of the first signal, and during the measurement based on the first signal, the first receive power is determined based on a receive power of the first signal.

According to a fourth aspect, an information receiving method is provided, and includes receiving, by a terminal device, first indication information sent by a base station, and measuring a first receive power based on the first indication information, where the first indication information is used to indicate a measurement manner of the first receive power, and the first receive power is used to indicate a signal strength of a cell.

The terminal device may measure the first receive power based on the measurement manner of the first receive power that is indicated by the first indication information, thereby helping the terminal device more accurately measure a signal strength of a signal sent by a network device.

According to the fourth aspect, in a possible design, to improve flexibility of measuring the first signal received power by the terminal device, the measurement manner of the first receive power may include measurement based on a reference signal, measurement based on a reference signal and a first signal, and measurement based on a first signal. The first signal is at least one of a synchronization signal, a positioning reference signal, and a broadcast signal.

For example, during the measurement based on the reference signal, a receive power of the reference signal is used as the first receive power, during the measurement based on the reference signal and the first signal, the first receive power is determined based on a receive power of the reference signal and a receive power of the first signal, and during the measurement based on a first signal, the first receive power is determined based on a receive power of the first signal.

According to a fifth aspect, a network device is provided, and includes a processing module and a transceiver module. The processing module is configured to obtain first indication information, where the first indication information is used to indicate a magnitude relationship between a transmit power of a first signal and a transmit power of a reference signal, or the first indication information is used to indicate the transmit power of the first signal, and the first signal is at least one of a synchronization signal, a positioning reference signal, and a broadcast signal. The transceiver module is configured to send the first indication information obtained by the processing module to a terminal device.

According to the fifth aspect, in a possible design, the first signal and the reference signal are signals of a serving cell, and the first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

According to the fifth aspect, in a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

According to the fifth aspect, in a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

According to the fifth aspect, in a possible design, the transceiver module is further configured to send second indication information to the terminal device, where the second indication information is used to indicate whether the first parameter value is the same as the second parameter value.

According to a sixth aspect, in the network device provided in the fifth aspect of the embodiments of this application, a physical device corresponding to the processing module may be a processor, and a physical device corresponding to the transceiver module may be a transceiver.

According to a seventh aspect, an embodiment of this application provides a computer storage medium, configured to store a computer software instruction used by the foregoing network device. The computer storage medium includes a program designed for performing the foregoing aspects.

According to an eighth aspect, a terminal device is provided, and includes a processing module and a transceiver module. The transceiver module is configured to receive first indication information sent by a network device, where the first indication information is used to indicate a magnitude relationship between a transmit power of a first signal and a transmit power of a reference signal, or the first indication information is used to indicate the transmit power of the first signal, and the first signal is at least one of a synchronization signal, a positioning reference signal, and a broadcast signal. The processing module is configured to determine a first receive power based on the first indication information, a receive power of the first signal, and a receive power of the reference signal.

According to the eighth aspect, in a possible design, the first signal and the reference signal are signals of a serving cell, and the first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

According to the eighth aspect, in a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

According to the eighth aspect, in a possible design, the first receive power is a linear average of the receive power of the first signal and the receive power of the reference signal.

According to the eighth aspect, in a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

According to the eighth aspect, in a possible design, the transceiver module is further configured to receive second indication information sent by the network device, where the second indication information is used to indicate whether the first parameter value is the same as the second parameter value. The processing module determines a first receive power of the serving cell based on the first parameter value in the first indication information, and a receive power of the first signal and a receive power of the reference signal that are in the serving cell, and when the second indication information indicates that the first parameter value is the same as the second parameter value, determines the first receive power of the adjacent cell based on the first parameter value, and a receive power of the first signal and a receive power of the reference signal that are in the adjacent cell, or when the second indication information indicates that the first parameter value is different from the second parameter value, determines the first receive power of the adjacent cell based on the second parameter value in the first indication information, and the receive power of the first signal and the receive power of the reference signal that are in the adjacent cell.

According to a ninth aspect, in the terminal device provided in the eighth aspect of the embodiments of this application, a physical device corresponding to the processing module may be a processor, and a physical device corresponding to the transceiver module may be a transceiver.

According to a tenth aspect, an embodiment of this application provides a computer storage medium, configured to store a computer software instruction used by the foregoing terminal device. The computer storage medium includes a program designed for performing the foregoing aspects.

According to an eleventh aspect, an embodiment of this application provides a communications system, including the network device and the terminal device in the foregoing embodiments.

According to a twelfth aspect, a network device is provided, and includes a processing module and a transceiver module. The processing module is configured to determine first indication information. The transceiver module is configured to send the first indication information to a terminal device, where the first indication information is used to indicate a measurement manner of a first receive power to the terminal device.

According to the twelfth aspect, in a possible design, the measurement manner of the first receive power includes measurement based on a reference signal, measurement based on a reference signal and a first signal, and measurement based on a first signal. The first signal is at least one of a synchronization signal, a positioning reference signal, and a broadcast signal.

For example, during the measurement based on the reference signal, a receive power of the reference signal is used as the first receive power, during the measurement based on the reference signal and the first signal, the first receive power is determined based on a receive power of the reference signal and a receive power of the first signal, and during the measurement based on the first signal, the first receive power is determined based on a receive power of the first signal.

According to a thirteenth aspect, in the network device provided in the twelfth aspect of the embodiments of this application, a physical device corresponding to the processing module may be a processor, and a physical device corresponding to the transceiver module may be a transceiver.

According to a fourteenth aspect, an embodiment of this application provides a computer storage medium, configured to store a computer software instruction used by the foregoing network device. The computer storage medium includes a program designed for performing the foregoing aspects.

According to a fifteenth aspect, a terminal device is provided, and includes a transceiver module and a processing module. The transceiver module is configured to receive first indication information sent by a base station. The processing module is configured to measure a first receive power based on the first indication information, where the first indication information is used to indicate a measurement manner of the first receive power, and the first receive power is used to indicate a signal strength of a cell.

According to the fifteenth aspect, in a possible design, the measurement manner of the first receive power includes measurement based on a reference signal, measurement based on a reference signal and a first signal, and measurement based on a first signal. The first signal is at least one of a synchronization signal, a positioning reference signal, and a broadcast signal.

For example, during the measurement based on the reference signal, a receive power of the reference signal is used as the first receive power, during the measurement based on the reference signal and the first signal, the first receive power is determined based on a receive power of the reference signal and a receive power of the first signal, and during the measurement based on the first signal, the first receive power is determined based on a receive power of the first signal.

According to a sixteenth aspect, in the terminal device provided in the fifteenth aspect of the embodiments of this application, a physical device corresponding to the processing module may be a processor, and a physical device corresponding to the transceiver module may be a transceiver.

According to a seventeenth aspect, an embodiment of this application provides a computer storage medium, configured to store a computer software instruction used by the foregoing terminal device. The computer storage medium includes a program designed for performing the foregoing aspects.

According to an eighteenth aspect, an embodiment of this application provides a communications system, including the network device and the terminal device in the foregoing embodiments.

DETAILED DESCRIPTION OF ILLUSTRATIVE EMBODIMENTS

Figure 1:
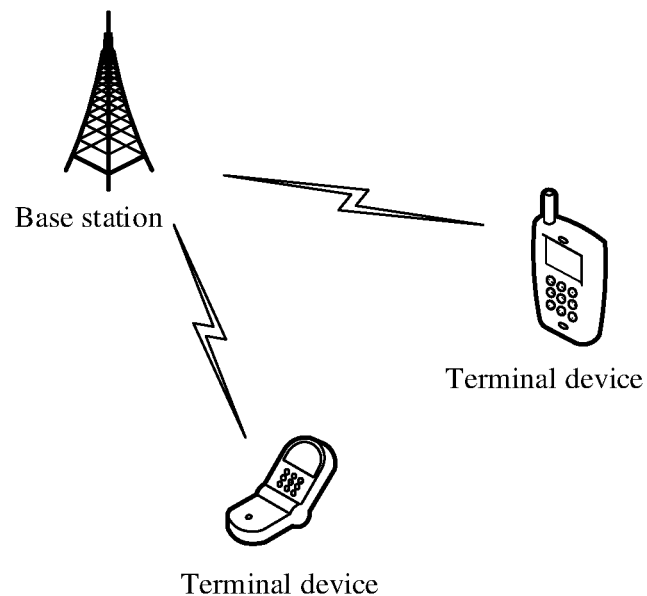
FIG. 1 is a schematic structural diagram of a communications system according to an embodiment of this application.

The following describes in detail the embodiments of this application with reference to the accompanying drawings of this specification.

The embodiments of this application may be applied to an LTE system, such as an NB-IoT system, or may be applied to other communications systems, such as a global system for mobile communications (GSM), a universal mobile telecommunications system (UMTS), a code division multiple access (CDMA) system, and a new network system.

A network device mentioned in the embodiments of this application may be a base station, an access point, or a device that is in an access network and that communicates with a wireless terminal over an air interface by using one or more sectors. When the network device is the base station, the base station may be configured to mutually convert a received over-the-air frame and an internet protocol (IP) packet and serve as a router between the wireless terminal and a rest portion of the access network. The rest portion of the access network may include an IP network. The base station may be further configured to coordinate attribute management on the air interface. For example, the base station may be a base transceiver station (BTS) in a GSM or CDMA system, or may be a NodeB (NodeB) in wideband code division multiple access (WCDMA), or may be an evolved NodeB (eNB) in an LTE system. This is not limited in the embodiments of this application.

A terminal device in the embodiments of this application may be a device that provides a user with voice and/or data connectivity, a handheld device with a wireless connection function, or another processing device connected to a wireless modem. The terminal may further be a wireless terminal. The wireless terminal may communicate with one or more core networks through a radio access network (RAN). The wireless terminal may be a mobile terminal, such as a mobile phone (or referred to as a "cellular" phone) or a computer having a mobile terminal. For example, the computer having a mobile terminal may be a portable, pocket-sized, handheld, or computer built-in mobile apparatus, or an in-vehicle mobile apparatus, which can exchange a language and/or data with the radio access network. For example, the wireless terminal may alternatively be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point (AP), a remote terminal, an access terminal, a user terminal, a user agent, a user device, or user equipment. This is not limited in the embodiments of this application.

It should be understood that a reference signal in the embodiments of this application may be a CRS, or may be an NRS in the NB-IoT system. This is not limited herein.

In the embodiments of this application, a first receive power is used to indicate a signal strength of a cell. Specifically, the first receive power may be used for cell selection, cell reselection, uplink power control, and the like. An objective of the cell selection is to enable the terminal device to camp on an appropriate cell. An objective of the cell reselection is to enable the terminal device to camp on a best serving cell. An objective of the uplink power control is to control an uplink transmit power of the terminal device. In addition, in the NB-IoT system, the first receive power is further used for coverage level selection and the like. The coverage level selection means that the terminal device measures a coverage level of the terminal device by using the first receive power, to further determine a quantity of repetition times of a narrowband physical random access channel (NPRACH).

In the embodiments of this application, the network device may send obtained first indication information to the terminal device, so that the terminal device may determine the first receive power by using the first indication information, and the terminal device may further more accurately measure the signal strength of the cell, thereby helping improve signal transmission quality in a communication process.

For ease of description, in the embodiments of this application, an example in which the network device is a base station is used for detailed description. This is merely an example enumerated in the embodiments of this application, and this application includes the example but is not limited thereto.

Specifically, FIG. 1 is a schematic structural diagram of a communications system according to an embodiment of this application. The communications system includes a base station and a terminal device.

An architecture of the communications system shown in FIG. 1 is used as an example to describe in detail the embodiments of this application.

Figure 2:
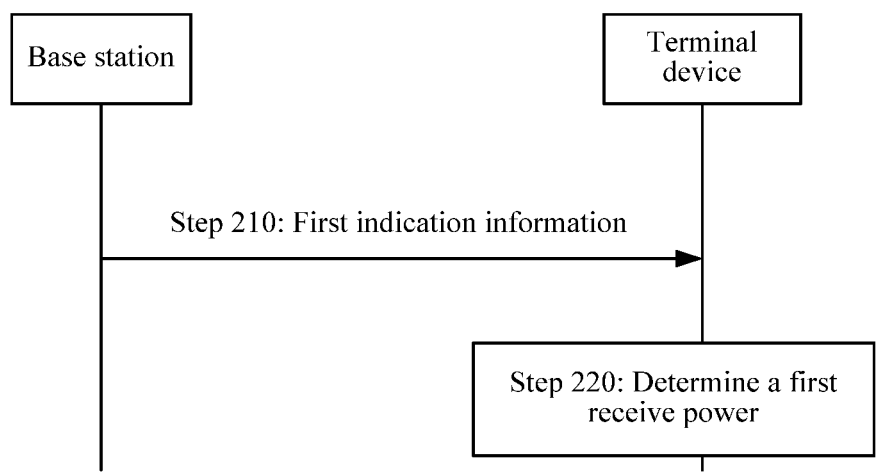
FIG. 2 is a schematic flowchart of a receive power measurement method according to an embodiment of this application.

As shown in FIG. 2, an embodiment of this application provides a receive power measurement method, including the following steps.

Step 210: A base station obtains first indication information, and sends the first indication information to a terminal device, and the terminal device receives the first indication information, where the first indication information is used to indicate a magnitude relationship between a transmit power of a first signal and a transmit power of a reference signal, or the first indication information is used to indicate the transmit power of the first signal, and the first signal may be at least one of a synchronization signal, a positioning reference signal, and a broadcast signal.

It should be noted that the synchronization signal includes a primary synchronization signal (PSS) and a secondary synchronization signal (SSS). In this embodiment of this application, the first signal may be independently the PSS, the SSS, the positioning reference signal, or the broadcast signal, or may be the SSS and the positioning reference signal, or the like. A quantity of signals included in the first signal is not limited in this embodiment of this application.

Step 220: The terminal device determines a first receive power based on the first indication information, a receive power of the first signal, and a receive power of the reference signal.

In this embodiment of this application, when the terminal device introduces the first signal to measure the first receive power, and when the first signal and the reference signal are signals of a same cell, a signal strength of the cell can be more accurately measured by using the obtained first receive power.

When the terminal device measures a first receive power of a serving cell, the first signal and the reference signal are signals of the serving cell. The terminal device needs to use the magnitude relationship between the transmit power of the first signal and the transmit power of the reference signal to determine the first receive power. However, in the prior art, in a process of measuring the first receive power, the base station already sends the transmit power of the reference signal to the terminal device. Therefore, when the first receive power is measured in a measurement manner in this embodiment of this application, the base station may notify the terminal device of only the first indication information used to indicate the transmit power of the first signal. In this case, the terminal device can determine the magnitude relationship between the transmit power of the first signal and the transmit power of the reference signal based on the transmit power of the reference signal and the transmit power of the first signal. In addition, alternatively, the base station may directly notify, after determining the magnitude relationship between the transmit power of the first signal and the transmit power of the reference signal, the terminal device of the first indication information indicating the magnitude relationship between the transmit power of the first signal and the transmit power of the reference signal, to reduce operations of the terminal device. Therefore, for measurement of the first receive power of the serving cell, the first indication information may be used to indicate the magnitude relationship between the transmit power of the first signal and the transmit power of the reference signal, or the first indication information may be used to indicate the transmit power of the first signal.

During specific implementation, the first indication information may be a ratio of the transmit power of the first signal to the transmit power of the reference signal or a difference between the transmit power of the first signal and the transmit power of the reference signal, or the first indication information is the transmit power of the first signal, or the first indication information may be a first index number, and the first index number is used to index the transmit power of the first signal or the magnitude relationship between the transmit power of the first signal and the transmit power of the reference signal.

For example, when the first indication information is the ratio of the transmit power of the first signal to the transmit power of the reference signal, the ratio may be as follows. When the transmit power of the first signal is a numerator, the transmit power of the reference signal is a denominator, or when the transmit power of the first signal is a denominator, the transmit power of the reference signal is a numerator. When the first indication information is the difference between the transmit power of the first signal and the transmit power of the reference signal, the difference may be as follows. The transmit power of the reference signal is subtracted from the transmit power of the first signal, or the transmit power of the first signal is subtracted from the transmit power of the reference signal. When the first indication information is the index number, an example in which the first index number corresponds to a ratio of the receive power of the first signal to the receive power of the reference signal is used. For example, when the ratio of the receive power of the first signal to the receive power of the reference signal is 1.2, the corresponding index number is 5. A correspondence between an index number and a ratio is shown in Table 1, and may be pre-configured in the terminal device and the network device. In addition, a table of the correspondence between an index number and a ratio may be alternatively pre-configured in the network device, and is delivered by the network device to the terminal device, provided that the network device and the terminal device use a same correspondence table. A specific implementation is not limited herein. When the first indication information is a difference between the receive power of the first signal and the receive power of the reference signal, a case is similar, and details are not described herein again.

TABLE 1

| Ratio | Index number |
|---|---|
| 0.5 | 0 |
| 0.6 | 1 |
| . . . | . . . |
| N | n (a positive integer) |

For the serving cell, the base station may add the first indication information to higher-layer signaling, such as a system message or another radio resource control (RRC) signaling, and send the signaling to the terminal device.

In addition, in step 200, the first indication information obtained by the base station is determined by the base station.

When the terminal device measures a first receive power of an adjacent cell, the first signal and the reference signal are signals of the adjacent cell. However, in the prior art, in a process of measuring the first receive power, the terminal device usually cannot obtain the transmit power of the reference signal in the adjacent cell. Therefore, in this embodiment of this application, to enable the terminal device to measure the first receive power of the adjacent cell, the first indication information sent by the base station to the terminal device is used to indicate the magnitude relationship between the transmit power of the first signal and the transmit power of the reference signal. When the terminal device can obtain the transmit power of the reference signal, the first indication information may be alternatively used to indicate only the transmit power of the first signal.

During specific implementation, the first indication information may be a ratio of the transmit power of the first signal to the transmit power of the reference signal or a difference between the transmit power of the first signal and the transmit power of the reference signal, or the first indication information is the transmit power of the first signal, or the first indication information is a second index number, and the second index number is used to index the magnitude relationship between the transmit power of the first signal and the transmit power of the reference signal. In addition, the first indication information may be alternatively the transmit power of the first signal and the transmit power of the reference signal, or the like. This is not limited herein.

For example, when the first indication information is the ratio of the transmit power of the first signal to the transmit power of the reference signal, the ratio may be as follows. When the transmit power of the first signal is a numerator, the transmit power of the reference signal is a denominator, or when the transmit power of the reference signal is a numerator, the transmit power of the first signal is a denominator. When the first indication information is the difference between the transmit power of the first signal and the transmit power of the reference signal, the difference may be as follows. The transmit power of the reference signal is subtracted from the transmit power of the first signal, or the transmit power of the first signal is subtracted from the transmit power of the reference signal. When the first indication information is the index number, for a specific implementation form, refer to the implementation in which the first indication information is the index number when the first receive power of the serving cell is measured, and details are not described herein again.

For the adjacent cell, the base station may add the first indication information to higher-layer signaling, such as a system message or another RRC signaling, and send the signaling to the terminal device. When the base station adds the first indication information to the system message, the system message may be specifically a system information block (SIB) 4 or a SIB 5. This is not limited herein.

In addition, for the adjacent cell, the first indication information obtained by the base station in step 200 is determined by a base station of the adjacent cell and then sent to a base station of the serving cell. Alternatively, the base station of the adjacent cell may send corresponding parameter information to the base station of the serving cell, and the base station of the serving cell determines the first indication information and then sends the first indication information to the terminal device. This is not limited herein.

The first indication information is not directly obtained by the terminal device from the adjacent cell, and instead, is sent by the base station of the serving cell to the terminal device, to avoid a case in which the terminal device cannot correctly obtain the first indication information through decoding when a signal in the serving cell greatly interferes with a signal of the first indication information in the adjacent cell, for example, when the terminal device is located in a center of the serving cell, thereby reducing power consumption of the terminal device while improving accuracy of obtaining the first indication information by the terminal device.

It should be noted that, in this embodiment of this application, the serving cell is a cell in which the terminal device is currently located, and the adjacent cell is a cell indicated by a cell identifier in an adjacent cell list. The adjacent cell list is configured by the base station. The adjacent cell list is usually sent to the terminal device by using the system message. In addition, in this embodiment of this application, the adjacent cell may be alternatively a cell geographically adjacent to the serving cell. The foregoing description is applicable to the serving cell and the adjacent cell in this application, and details are not described below again.

In addition, in this embodiment of this application, the first indication information may include only information indicating the magnitude relationship between the transmit power of the first signal in the serving cell and the transmit power of the reference signal in the serving cell, or include only information about the transmit power of the first signal in the serving cell, or include only information indicating the magnitude relationship between the transmit power of the first signal in the adjacent cell and the transmit power of the reference signal in the adjacent cell. During specific implementation, to reduce signaling overheads, the first indication information may not only include the information indicating the magnitude relationship between the transmit power of the first signal in the serving cell and the transmit power of the reference signal in the serving cell, but also include the information indicating the magnitude relationship between the transmit power of the first signal in the adjacent cell and the transmit power of the reference signal in the adjacent cell. Alternatively, the first indication information not only includes the information about the transmit power of the first signal in the serving cell, but also include the information indicating the magnitude relationship between the transmit power of the first signal and the transmit power of the reference signal in the adjacent cell. This is not limited herein.

The first indication information may include one or more pieces of information indicating the magnitude relationship between the transmit power of the first signal and the transmit power of the reference signal in different adjacent cells.

When the first indication information includes a plurality of pieces of indication information, during specific implementation of sending the first indication information, the base station adds the first indication information to one piece of signaling and sends the signaling to the terminal device. Alternatively, the base station may add a part of the first indication information to first signaling and send the first signaling to the terminal device, and add a remaining part of the first indication information to second signaling and send the second signaling to the terminal device. The first signaling and the second signaling are different. An amount of sent signaling carrying the first indication information is not limited in this embodiment of this application.

For example, the first indication information includes a first parameter value and a second parameter value, the first parameter value is a first index number, or the first parameter value is a ratio of a transmit power of a first signal to a transmit power of a reference signal in a serving cell or a difference between the transmit power of the first signal and the transmit power of the reference signal in the serving cell, and the second parameter value is a second index number, or the second parameter value is a ratio of a transmit power of a first signal to a transmit power of a reference signal in an adjacent cell or a difference between the transmit power of the first signal and the transmit power of the reference signal in the adjacent cell.

The first indication information includes the first parameter value and the second parameter value. Optionally, the base station sends second indication information to a terminal, to indicate, to the terminal device, whether the first parameter value is the same as the second parameter value.

It should be noted that, when the second indication information indicates, to the terminal device, whether the first parameter value is the same as the second parameter value, an operation rule of the first parameter value is usually the same as that of the second parameter value. For example, for the serving cell, if a first transmit power is W1 and a second transmit power is W2, the first parameter value is W1/W2. When the second parameter value is W1/W2 for the adjacent cell, the operation rule of the first parameter value is the same as that of a second parameter. If the first parameter value is W1/W2 for the serving cell, and the second parameter value is W2/W1 for the adjacent cell, or the second parameter value is (the transmit power of the reference signal—the transmit power of the first signal) for the adjacent cell, the operation rule of the first parameter value is different from that of the second parameter.

In addition, when the first parameter value is the first index number, and the second parameter value is the second index number, for example, if the first index number corresponds to the ratio of the transmit power of the first signal to the transmit power of the reference signal, and the second index number corresponds to the difference between the transmit power of the first signal and the transmit power of the reference signal, an operation rule of the first index number is different from that of a second index. When the first index number corresponds to W1/W2, and the second index number also corresponds to W1/W2, where the first transmit power is W1, and the second transmit power is W2, the operation rule of the first index number is the same as that of the second index number.

Figure 3:
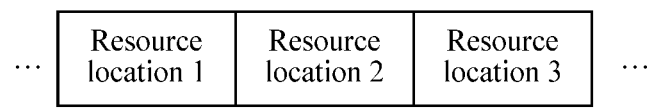
FIG. 3 is a schematic diagram of a resource location according to an embodiment of this application.

For example, during specific implementation, the second indication information may be indicated by using one bit. For example, one-bit indication information is added to a resource carrying a parameter value of each adjacent cell. As shown in FIG. 3, in the SIB 4, a parameter value of an adjacent cell 1 is carried at a resource location 1, a parameter value of an adjacent cell 2 is carried at a resource location 2, and a parameter value of an adjacent cell 3 is carried at a resource location 4. When the parameter value of the adjacent cell 1 is the same as a parameter value of the serving cell, a binary "1" is used for indication. Assuming that the parameter value of the adjacent cell 1 is 0101, one-bit information "1" is added after an end location or before a start location of the parameter value 0101 of the adjacent cell 1. For example, if the one-bit information "1" is added before the start location of 0101, information added to the resource location 1 is 10101. A location of the second indication information in the parameter value is not limited in this application. When the parameter value of the adjacent cell 1 is different from the parameter value of the serving cell, a binary "0" may be used for indication, provided that a specific value indicating that the parameter value of the adjacent cell 1 is the same as the parameter value of the serving cell is different from a specific value indicating that the parameter value of the adjacent cell 1 is different from the parameter value of the serving cell. A quantity of bits carrying the second indication information is not limited in this embodiment of this application.

Alternatively, one bitmap may be carried in a MIB, a SIB, or RRC signaling, and each bit in the bitmap is used to indicate whether a bit value of one adjacent cell is the same as a bit value of the serving cell. For example, the bitmap is 101, where 1 at the first bit and 1 at the third bit are respectively used to indicate that a parameter value of an adjacent cell 1 and a parameter value of an adjacent cell 3 are the same as the parameter value of the serving cell, and 0 at the second bit is used to indicate that a parameter value of an adjacent cell 2 is different from the parameter value of the serving cell. Specifically, in this implementation, the first indication information and the second indication information may be respectively carried in different signaling messages, or may be carried in a same signaling message. This is not specifically limited.

In step 220, it should be noted that after the terminal device receives the first indication information, during specific implementation, the terminal device may determine the first receive power based on the first indication information, the receive power of the first signal, and the receive power of the reference signal, or in a manner of directly determining the first receive power by measuring the receive power of the reference signal in the prior art. This is not limited in this embodiment of this application.

To improve accuracy of measuring the signal strength of the cell by the terminal device, optionally, the terminal device determines the first receive power based on the first indication information, the receive power of the first signal, and the receive power of the reference signal.

Specifically, the first receive power is a linear average of the receive power of the first signal and the receive power of the reference signal.

For example, when the first indication information is the ratio of the transmit power of the first signal to the transmit power of the reference signal, the terminal device determines a first coefficient and a second coefficient based on the first indication information, and determines the first receive power based on the first coefficient, the second coefficient, the receive power of the first signal, and the receive power of the reference signal. The first coefficient is a weight of the receive power of the first signal, and the second coefficient is a weight of the receive power of the reference signal.

Optionally, the terminal device determines the first coefficient and the second coefficient based on the ratio of the transmit power of the first signal to the transmit power of the reference signal. The terminal device determines the linear average $W_0$ of the receive power of the first signal and the receive power of the reference signal according to the following expression, and $W_0$ is the first receive power:

$$W_0 = \sigma_1 \cdot W_1 + \sigma_2 \cdot W_2, \text{ where}$$

For example, when the first indication information is the difference between the transmit power of the first signal and the transmit power of the reference signal, the terminal device determines a first coefficient and a second coefficient based on the difference between the transmit power of the first signal and the transmit power of the reference signal. The first coefficient and the second coefficient may be determined based on a table of a pre-configured correspondence among the difference, the first coefficient, and the second coefficient. For example, Table 2 shows the correspondence among the difference, the first coefficient, and the second coefficient.

TABLE 2

| Difference | First coefficient | Second coefficient |
| --- | --- | --- |
| 0 | 0.5 | 0.5 |
| 1 | 0.6 | 0.4 |
| 2 | 0.7 | 0.3 |
| ... | ... | ... |

When the difference between the transmit power of the first signal and the transmit power of the reference signal is 1, the first coefficient is 0.6 and the second coefficient is 0.4.

In addition, for example, when the first indication information is used to indicate $$A = 10 \log_{10} \frac{W_1}{W_2},$$

where $W_1$ is the receive power of the first signal, and $W_2$ is the receive power of the reference signal, the linear average $W_0$ of the receive power of the first signal and the receive power of the reference signal may be determined according to the following expression, and $W_0$ is the first receive power:

$$W_0 = \left(10^{\frac{W_1 - A}{10}} + 10^{\frac{W_2}{10}}\right) / K,$$

where

K is a total quantity of REs carrying the first signal and the reference signal. In this example, $W_1 - A$ is used to scale or adjust the receive power of the first signal and the receive power of the reference signal. In addition, a manner of scaling or adjusting the receive power of the first signal and the receive power of the reference signal is not limited in this embodiment of this application.

It should be noted that an implementation of determining the first receive power based on the first indication information, the receive power of the first signal, and the receive power of the reference signal is not limited in this embodiment of this application. The foregoing is only an example for description.

When the terminal device receives the second indication information, the terminal device may determine the first receive power based on the following manner.

The terminal device determines a first receive power of the serving cell based on the first parameter value in the first indication information, and a receive power of the first signal and a receive power of the reference signal that are in the serving cell, and when the second indication information indicates that the first parameter value is the same as the second parameter value, determines a first receive power of the adjacent cell based on the first parameter value, and a receive power of the first signal and a receive power of the reference signal that are in the adjacent cell, or when the second indication information indicates that the first parameter value is different from the second parameter value, determines the first receive power of the adjacent cell based on the second parameter value in the first indication information, and the receive power of the first signal and the receive power of the reference signal that are in the adjacent cell.

For example, when the first parameter value and the second parameter value both are 0.5, the first receive power of the adjacent cell is determined based on the first parameter value, and the receive power of the first signal and the receive power of the reference signal that are in the adjacent cell. A specific implementation is similar to the foregoing implementation, and details are not described herein again.

In addition, in an inband deployment mode in an NB-IoT system, the first signal may further be a CRS, and two scenarios, namely, a same physical cell identifier (PCI) scenario and a different PCI scenario, may be obtained through classification in the inband deployment mode. The inband deployment mode means that a frequency band used in the NB-IoT system is a frequency subband of a frequency band used in a conventional LTE system. Therefore, when the NB-IOT system measures a receive power of an NRS, a CRS in LTE may be introduced for measurement. Specifically, in a same PCI scenario of the serving cell, the base station may provide the terminal device with related parameters of the CRS, such as a P-CID, a port quantity, a power offset, and an RB index. The power offset is carried in a SIB 1, and the RB index is carried in a MIB, so that the terminal device may obtain a transmit power of the CRS based on the power offset. Therefore, the first signal in the manner, shown in FIG. 2, in which the terminal device measures the first receive power in the same PCI scenario may further be the CRS. However, in the different PCI scenario, in an existing mechanism, the base station cannot provide the terminal device with a P-CID, a power offset, and an RB index that are of the CRS in the LTE system. Therefore, in a different PCI scenario for the serving cell, the base station of the serving cell sends, to the terminal device, information indicating a P-CID, a power offset, and an RB index that are of the cell in the LTE system. In a different PCI scenario for the adjacent cell, the base station of the serving cell sends, to the terminal device, information indicating a P-CID, a power offset, and an RB index that are of the adjacent cell in the LTE system. In a same PCI scenario for the adjacent cell, the base station of the serving cell sends, to the terminal device, information indicating a P-CID, a power offset, and an RB index that are of the adjacent cell in the LTE system. After obtaining the P-CID, the power offset, and the RB index that are of the CRS, the terminal device can determine content, a location, and a power of the CRS, and therefore can obtain the first receive power based on the CRS and the NRS in the manner of measuring the first receive power shown in FIG. 2.

Figure 4:
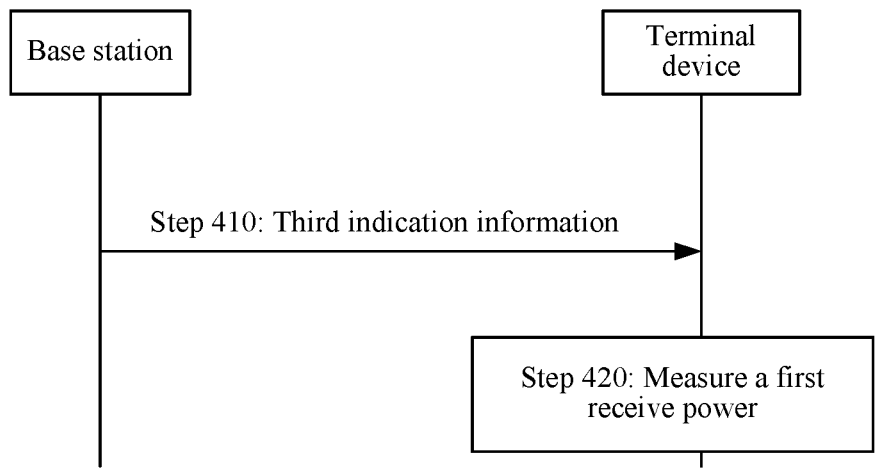
FIG. 4 is a schematic flowchart of an indication information transmission method according to an embodiment of this application.

As shown in FIG. 4, an example of this application further provides an indication information transmission method, including the following steps.

Step 410: A base station determines third indication information, and sends the third indication information to a terminal device, and the terminal device receives the third indication information sent by the base station, where the third indication information is used to indicate, to the terminal device, a measurement manner of a first receive power, and the first receive power is used to indicate a signal strength of a cell.

Step 420: The terminal device measures the first receive power in the measurement manner of the first receive power that is indicated by the third indication information to the terminal device.

The base station indicates the measurement manner of the first receive power to the terminal device, so that the terminal device can measure the first receive power in the measurement manner indicated by the base station, thereby helping reduce power consumption of the terminal device.

Optionally, the measurement manner of the first receive power for the terminal device includes measurement based on a reference signal, measurement based on a reference signal and a first signal, and measurement based on a first signal. During the measurement based on the reference signal, a receive power of the reference signal may be used as the first receive power, during the measurement based on the reference signal and the first signal, the first receive power is determined based on a receive power of the reference signal and a receive power of the first signal, and during the measurement based on the first signal, the first receive power is determined based on a receive power of the first signal.

For example, in this embodiment of this application, the measurement based on the reference signal may be the same as a measurement manner of a receive power of a reference signal in the prior art, the measurement based on the reference signal and the first signal may be the same as the measurement manner of the first receive power shown in FIG. 2, and during the measurement based on the first signal, a reference signal in measurement based on the reference signal in the prior art may be replaced with the first signal.

For example, this embodiment of this application provides a specific method for indicating the measurement manner of the reference signal to the terminal device.

The base station determines a receive power of an uplink signal of the terminal device. When a deviation between the receive power of the uplink signal and a preset expected value exceeds a preset threshold, it is determined that the measurement manner of the first receive power indicated by the third indication information is the measurement based on the first signal and the reference signal, or when the deviation between the receive power of the uplink signal and the preset expected value does not exceed the preset threshold, it is determined that the measurement manner of the first receive power indicated by using the third indication information is the measurement based on the reference signal or the measurement based on the first signal.

When the terminal device is in a poor channel environment, the base station may instruct the terminal device to measure the first receive power based on the first signal and the reference signal, and when the terminal device is in a good channel environment, may instruct the terminal device to measure the first receive power based on the first signal or the reference signal, thereby helping reduce power consumption of the terminal device, and helping improve accuracy of measuring the signal strength of the cell.

Based on a same concept, an embodiment of this application further provides a network device, and the network device is configured to perform an action or a function of the network device in the foregoing method embodiments.

Based on a same concept, an embodiment of this application further provides a terminal device, and the terminal device is configured to perform an action or a function of the terminal device in the foregoing method embodiments.

An embodiment of this application further provides a communications system, including the network device and the terminal device in the foregoing embodiments.

For brevity, for content in an apparatus part, specifically refer to the method embodiments. Details are not repeatedly described.

Figure 5A:
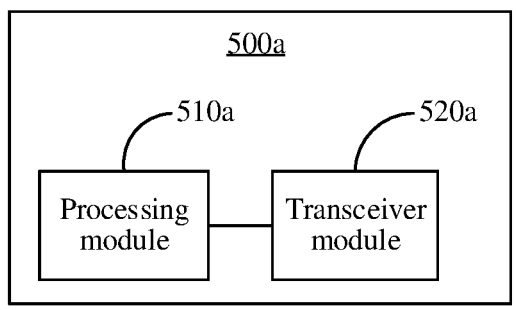
FIG. 5a and FIG. 5b are respectively schematic structural diagrams of a network device according to an embodiment of this application.

As shown in FIG. 5a, a network device 500a in an embodiment of this application includes a processing module 510a and a transceiver module 520a. The processing module 510a is configured to obtain first indication information. The first indication information is used to indicate a magnitude relationship between a transmit power of a first signal and a transmit power of a reference signal, or the first indication information is used to indicate the transmit power of the first signal, and the first signal is at least one of a synchronization signal, a positioning reference signal, and a broadcast signal. The transceiver module 520a is configured to send the first indication information obtained by the processing module to a terminal device.

In a possible design, the first signal and the reference signal are signals of a serving cell.

The first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

In a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

In a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

In a possible design, the transceiver module 520a is further configured to send second indication information to the terminal device, where the second indication information is used to indicate whether the first parameter value is the same as the second parameter value.

Figure 5B:
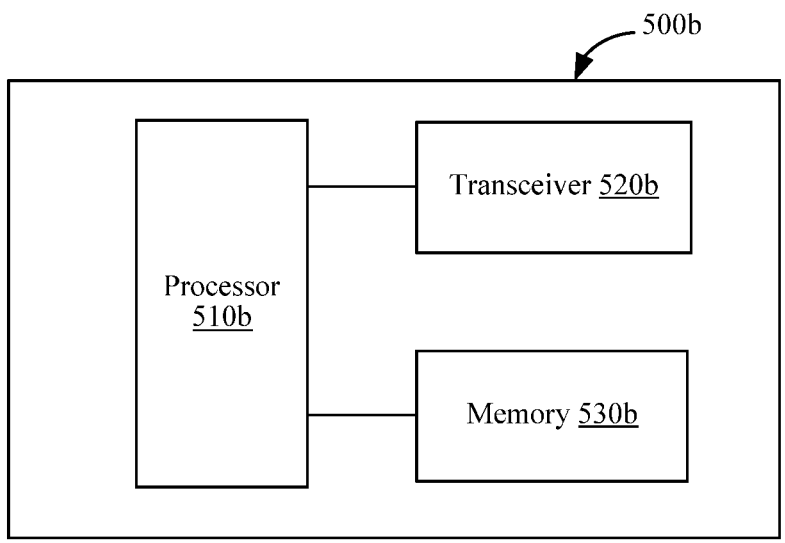

It should be noted that, in this embodiment of this application, the processing module 510a may be implemented by a processor, and the transceiver module 520a may be implemented by a transceiver. As shown in FIG. 5b, a network device 500b may include a processor 510b, a transceiver 520b, and a memory 530b. The memory 530b may be configured to store a program/code pre-installed when a base station 500b is at delivery, or may be configured to store code or the like to be executed by the processor 510b.

The processor 500b may be a general-purpose central processing unit (CPU), a microprocessor, an application-specific integrated circuit (ASIC), or one or more integrated circuits, and is configured to perform a related operation, to implement the technical solution provided in this embodiment of this application.

It should be noted that, although the network device 500b shown in FIG. 5b shows only the processor 500b, the transceiver 520b, and the memory 530b, in a specific implementation process, a person skilled in the art should understand that the base station 500b further includes another component necessary for normal running. In addition, according to a specific requirement, a person skilled in the art should understand that the base station 500b may further include hardware components for implementing other additional functions. In addition, a person skilled in the art should understand that the base station 500b may include only components or modules necessary for implementing this embodiment of this application, but not necessarily include all the components shown in FIG. 5b.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments may be performed. The foregoing storage medium may include a magnetic disk, an optical disc, a read-only memory (ROM), a random access memory (RAM), or the like.

Figure 6A:
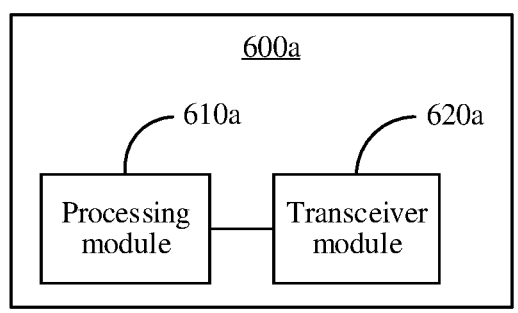
FIG. 6a and FIG. 6b are respectively schematic structural diagrams of a terminal device according to an embodiment of this application.

As shown in FIG. 6a, a terminal device 600a in an embodiment of this application includes a processing module 610a and a transceiver module 620a. The transceiver module 620a is configured to receive first indication information sent by a network device, where the first indication information is used to indicate a magnitude relationship between a transmit power of a first signal and a transmit power of a reference signal, or the first indication information is used to indicate the transmit power of the first signal, and the first signal is at least one of a synchronization signal, a positioning reference signal, and a broadcast signal. The processing module 610a is configured to determine a first receive power based on the first indication information, a receive power of the first signal, and a receive power of the reference signal.

In a possible design, the first signal and the reference signal are signals of a serving cell, and the first indication information is a ratio of the transmit power of the first signal to the transmit power of the reference signal or a difference between the transmit power of the first signal and the transmit power of the reference signal, or the first indication information is the transmit power of the first signal, or the first indication information is a first index number, and the first index number is used to index the transmit power of the first signal or the magnitude relationship between the transmit power of the first signal and the transmit power of the reference signal.

In a possible design, the first signal and the reference signal are signals of an adjacent cell, and the first indication information is a ratio of the transmit power of the first signal to the transmit power of the reference signal or a difference between the transmit power of the first signal and the transmit power of the reference signal, or the first indication information is a second index number, and the second index number is used to index the magnitude relationship between the transmit power of the first signal and the transmit power of the reference signal.

In a possible design, the first receive power is a linear average of the receive power of the first signal and the receive power of the reference signal.

In a possible design, the first indication information includes a first parameter value and a second parameter value, the first parameter value is a first index number, and the first index number is used to index the transmit power of the first signal or the magnitude relationship between the transmit power of the first signal and the transmit power of the reference signal, or the first parameter value is a ratio of a transmit power of a first signal to a transmit power of a reference signal in a serving cell or a difference between the transmit power of the first signal and the transmit power of the reference signal in the serving cell, and the second parameter value is a second index number, and the second index number is used to index the magnitude relationship between the transmit power of the first signal and the transmit power of the reference signal, or the second parameter value is a ratio of a transmit power of a first signal to a transmit power of a reference signal in an adjacent cell or a difference between the transmit power of the first signal and the transmit power of the reference signal in the adjacent cell.

In a possible design, the transceiver module 620a is further configured to receive second indication information sent by the network device, where the second indication information is used to indicate whether the first parameter value is the same as the second parameter value. The processing module 620a determines a first receive power of the serving cell based on the first parameter value in the first indication information, and a receive power of the first signal and a receive power of the reference signal that are in the serving cell, and when the second indication information indicates that the first parameter value is the same as the second parameter value, determines a first receive power of the adjacent cell based on the first parameter value, and a receive power of the first signal and a receive power of the reference signal that are in the adjacent cell, or when the second indication information indicates that the first parameter value is different from the second parameter value, determines the first receive power of the adjacent cell based on the second parameter value in the first indication information, and the receive power of the first signal and the receive power of the reference signal that are in the adjacent cell.

Figure 6B:
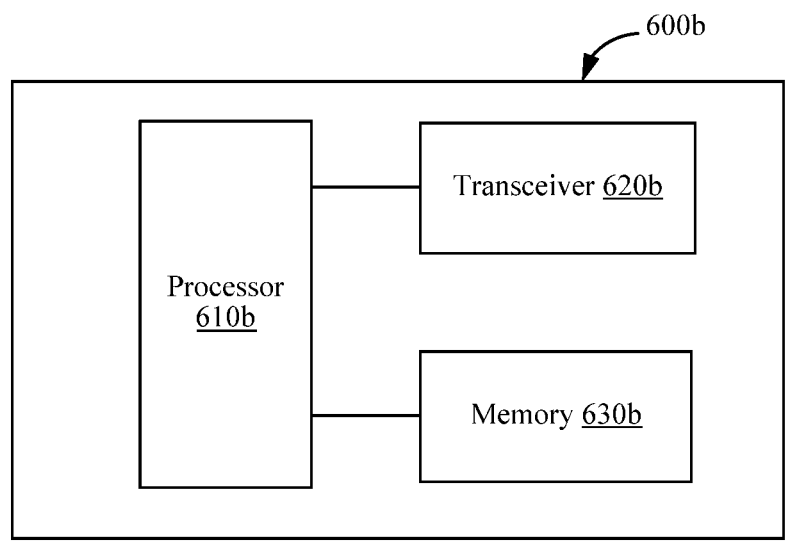

It should be noted that, in this embodiment of this application, the processing module 610a may be implemented by a processor, and the transceiver module 620a may be implemented by a transceiver. As shown in FIG. 6b, a terminal device 600b may include a processor 610b, a transceiver 620b, and a memory 630b. The memory 630b may be configured to store a program/code pre-installed when the terminal device 600b is at delivery, or may be configured to store code or the like to be executed by the processor 610b.

The processor 610b may be a general-purpose CPU, a microprocessor, an ASIC, or one or more integrated circuits, and is configured to perform a related operation, to implement the technical solution provided in this embodiment of this application.

It should be noted that, although the terminal device 600b shown in FIG. 6b shows only the processor 610b, the transceiver 620b, and the memory 630b, in a specific implementation process, a person skilled in the art should understand that the terminal device 600b further includes another component necessary for normal running. In addition, according to a specific requirement, a person skilled in the art should understand that the terminal device 600b may further include hardware components for implementing other additional functions. In addition, a person skilled in the art should understand that the terminal device 600b may include only components or modules necessary for implementing this embodiment of this application, but not necessarily include all the components shown in FIG. 6b.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments may be performed. The storage medium may be a magnetic disk, an optical disc, a ROM, a RAM, or the like.

Figure 7:
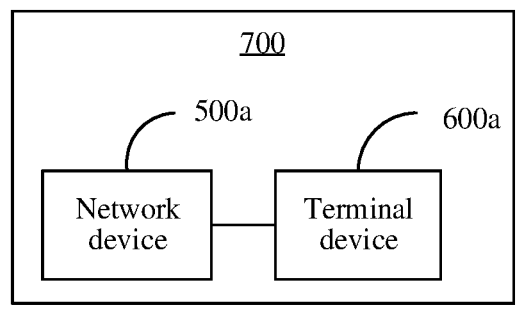
FIG. 7 is a schematic structural diagram of a communications system according to an embodiment of this application.

As shown in FIG. 7, an embodiment of this application provides a communications system 700, including the network device 500a shown in FIG. 5 and the terminal device 600a shown in FIG. 6.

Figure 8A:
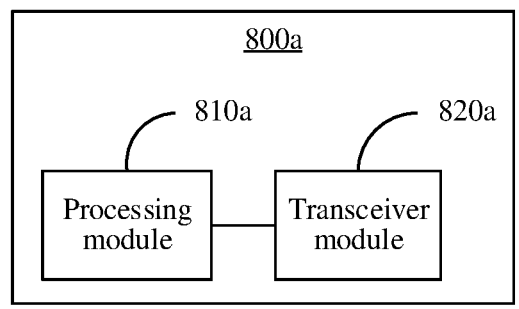
FIG. 8a and FIG. 8b are respectively schematic structural diagrams of a network device according to an embodiment of this application.

As shown in FIG. 8a, a network device 800a in an embodiment of this application includes a processing module 810a and a transceiver module 820a. The processing module 810a is configured to determine first indication information. The transceiver module 820a is configured to send the first indication information to a terminal device. The first indication information is used to indicate a measurement manner of a first receive power to the terminal device.

In a possible design, the measurement manner of the first receive power includes measurement based on a reference signal, measurement based on a reference signal and a first signal, and measurement based on a first signal. The first signal is at least one of a synchronization signal, a positioning reference signal, and a broadcast signal.

For example, during the measurement based on the reference signal, a receive power of the reference signal is used as the first receive power, during the measurement based on the reference signal and the first signal, the first receive power is determined based on a receive power of the reference signal and a receive power of the first signal, and during the measurement based on a first signal, the first receive power is determined based on a receive power of the first signal.

Figure 8B:
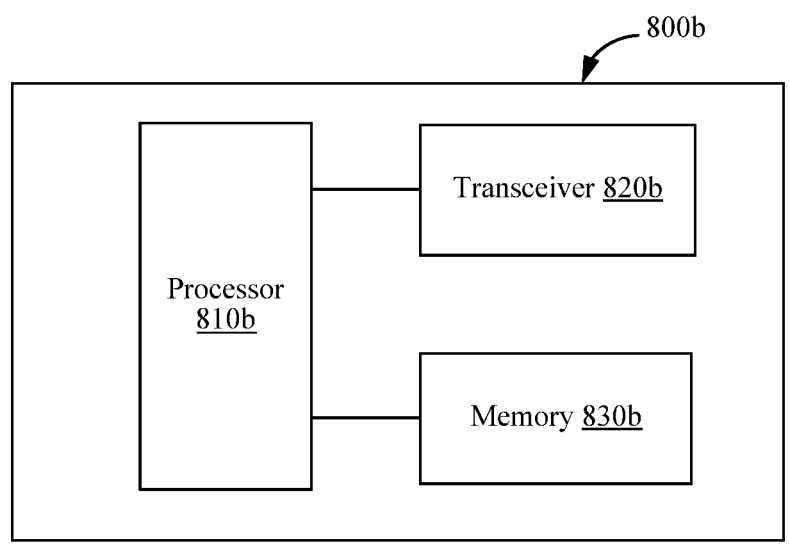

It should be noted that, in this embodiment of this application, the processing module 810a may be implemented by a processor, and the transceiver module 820a may be implemented by a transceiver. As shown in FIG. 8b, a network device 800b may include a processor 810b, a transceiver 820b, and a memory 830b. The memory 830b may be configured to store a program/code pre-installed when a base station 800b is at delivery, or may be configured to store code or the like to be executed by the processor 810b.

The processor 810b may be a general-purpose CPU, a microprocessor, an ASIC, or one or more integrated circuits, and is configured to perform a related operation, to implement the technical solution provided in this embodiment of this application.

It should be noted that, although the network device 800b shown in FIG. 8b shows only the processor 810b, the transceiver 820b, and the memory 830b, in a specific implementation process, a person skilled in the art should understand that the base station 800b further includes another component necessary for normal running. In addition, according to a specific requirement, a person skilled in the art should understand that the base station 800b may further include hardware components for implementing other additional functions. In addition, a person skilled in the art should understand that the base station 800b may include only components or modules necessary for implementing this embodiment of this application, but not necessarily include all the components shown in FIG. 8b.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments may be performed. The storage medium may be a magnetic disk, an optical disc, a ROM, a RAM, or the like.

Figure 9A:
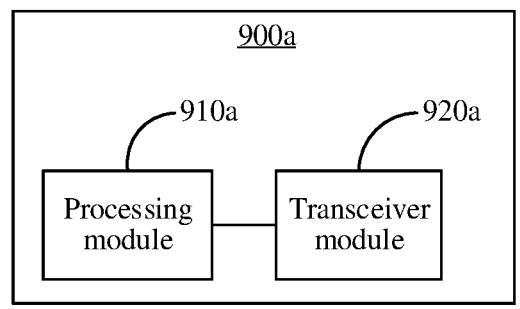
FIG. 9a and FIG. 9b are respectively schematic structural diagrams of a terminal device according to an embodiment of this application.

As shown in FIG. 9a, a terminal device 900a in an embodiment of this application includes a transceiver module 920a and a processing module 910a. The transceiver module 920a is configured to receive first indication information sent by a base station. The processing module 9100a is configured to measure a first receive power based on the first indication information. The first indication information is used to indicate a measurement manner of the first receive power, and the first receive power is used to indicate a signal strength of a cell.

In a possible design, the measurement manner of the first receive power includes measurement based on a reference signal, measurement based on a reference signal and a first signal, and measurement based on a first signal. The first signal is at least one of a synchronization signal, a positioning reference signal, and a broadcast signal.

Figure 9B:
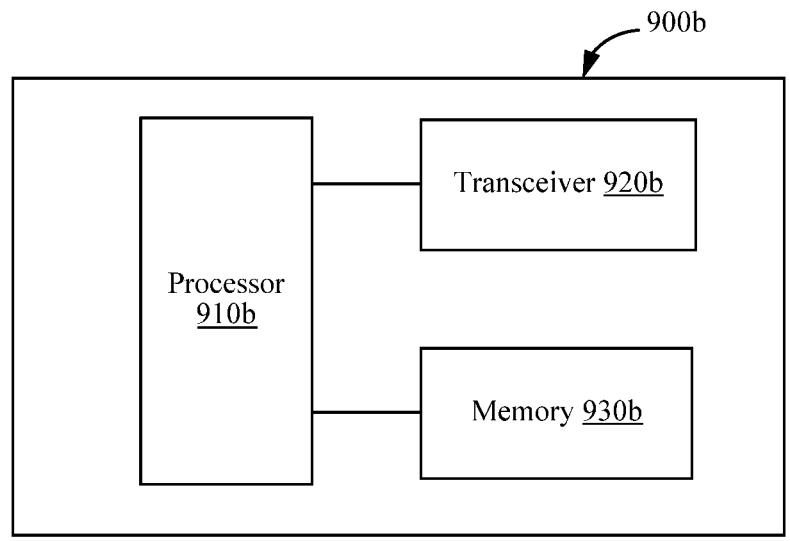

It should be noted that, in this embodiment of this application, the processing module 910a may be implemented by a processor, and the transceiver module 920a may be implemented by a transceiver. As shown in FIG. 9b, a terminal device 900b may include a processor 910b, a transceiver 920b, and a memory 930b. The memory 930b may be configured to store a program/code pre-installed when the terminal device 900b is at delivery, or may be configured to store code or the like to be executed by the processor 910b.

The processor 910b may be a general-purpose CPU, a microprocessor, an ASIC, or one or more integrated circuits, and is configured to perform a related operation, to implement the technical solution provided in this embodiment of this application.

It should be noted that, although the terminal device 900b shown in FIG. 9b shows only the processor 910b, the transceiver 920b, and the memory 930b, in a specific implementation process, a person skilled in the art should understand that the terminal device 900b further includes another component necessary for normal running. In addition, according to a specific requirement, a person skilled in the art should understand that the terminal device 900b may further include hardware components for implementing other additional functions. In addition, a person skilled in the art should understand that the terminal device 900b may include only components or modules necessary for implementing this embodiment of this application, but not necessarily include all the components shown in FIG. 9b.

A person of ordinary skill in the art may understand that all or some of the procedures of the methods in the embodiments may be implemented by a computer program instructing relevant hardware. The program may be stored in a computer readable storage medium. When the program runs, the procedures of the methods in the embodiments may be performed. The storage medium may be a magnetic disk, an optical disc, a ROM, a RAM, or the like.

Figure 10:
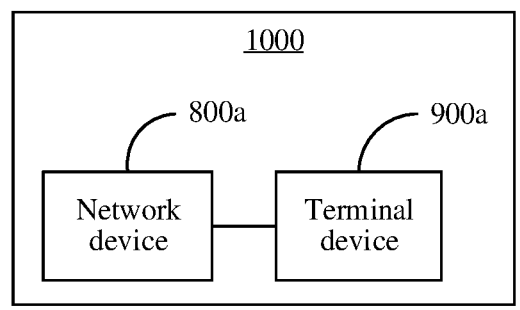
FIG. 10 is a schematic structural diagram of a communications system according to an embodiment of this application.

As shown in FIG. 10, a communications system 1000 in an embodiment of this application includes the network device 800a shown in FIG. 8a and the terminal device 900a shown in FIG. 9a.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, and an optical memory) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general purpose computer, a special purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies of this application.

What is claimed is:

1. An information sending method, comprising:
obtaining, by a network device, first indication information, wherein the first indication information indicates a magnitude relationship between a transmit power of a first signal received by a terminal device and a transmit power of a reference signal received by the terminal device, wherein the terminal device is a terminal of a narrowband internet of things (NB-IoT) system, wherein the reference signal is a narrowband reference signal (NRS), wherein the first signal is a secondary synchronization signal, wherein the first signal and the reference signal are signals of one of a serving cell or an adjacent cell, and wherein the magnitude relationship is a ratio of the transmit power of the first signal to the transmit power of the reference signal; and sending the first indication information from the network device to the terminal device;

wherein the first indication information further includes a first parameter value and a second parameter value;

wherein the first parameter value is one of a first index number, a ratio of a transmit power of a first signal to a transmit power of a reference signal in a serving cell, or a difference between the transmit power of the first signal and the transmit power of the reference signal in the serving cell; and wherein the second parameter value is one of a second index number, a ratio of a transmit power of a first signal to a transmit power of a reference signal in an adjacent cell, or a difference between the transmit power of the first signal and the transmit power of the reference signal in the adjacent cell.

2. The method according to claim 1, wherein the first signal and the reference signal are signals of the serving cell.

3. The method according to claim 2, wherein the sending the first indication information to the terminal device comprises:

sending the first indication information to the terminal device according to a system message.

4. The method according to claim 1, wherein the first signal and the reference signal are signals of the adjacent cell.

5. The method according to claim 4, wherein the sending the first indication information comprises:

sending the first indication information to the terminal device according to a system message that is at least one of a system information block (SIB) 4 or a SIB 5.

6. A receive power measurement method, comprising:

receiving, by a terminal device, first indication information sent by a network device, wherein the first indication information indicates a magnitude relationship between a transmit power of a first signal received by the terminal device and a transmit power of a reference signal received by the terminal device, wherein the terminal device is a terminal of a narrowband internet of things (NB-IoT) system, wherein the reference signal is a narrowband reference signal (NRS), wherein the first signal is a secondary synchronization signal, wherein the first signal and the reference signal are signals of one of a serving cell or an adjacent cell, and wherein the magnitude relationship is a ratio of the transmit power of the first signal to the transmit power of the reference signal; and determining a first receive power according to the first indication information;

wherein the first indication information further includes a first parameter value and a second parameter value;

wherein the first parameter value is one of a first index number, a ratio of a transmit power of a first signal to a transmit power of a reference signal in a serving cell, or a difference between the transmit power of the first signal and the transmit power of the reference signal in the serving cell; and wherein the second parameter value is one of a second index number, a ratio of a transmit power of a first signal to a transmit power of a reference signal in an adjacent cell, or a difference between the transmit power of the first signal and the transmit power of the reference signal in the adjacent cell.

7. The method according to claim 6, wherein the first signal and the reference signal are signals of the serving cell.

8. The method according to claim 7, wherein the receiving the first indication information comprises:

receiving the first indication information sent by the network device according to a system message.

9. The method according to claim 6, wherein the first signal and the reference signal are signals of an adjacent cell.

10. The method according to claim 9, wherein the receiving the first indication information comprises:

receiving the first indication information sent by the network device according to a system message that is at least one of a system information block (SIB) 4 or a SIB 5.

11. A communication apparatus, comprising:

a transmitter;

a processor; and a non-transitory computer-readable storage medium storing a program to be executed by the processor, the program including instructions to:

obtain first indication information, wherein the first indication information indicates a magnitude relationship between a transmit power of a first signal received at a terminal device and a transmit power of a reference signal received at the terminal device, wherein the terminal device is a terminal of a narrowband internet of things (NB-IoT) system, and wherein the reference signal is a narrowband reference signal (NRS); and cause the transmitter to send the first indication information to the terminal device, wherein the first signal is a secondary synchronization signal, wherein the first signal and the reference signal are signals of one of a serving cell or an adjacent cell, and wherein the magnitude relationship is a ratio of the transmit power of the first signal to the transmit power of the reference signal;

wherein the first indication information further includes a first parameter value and a second parameter value;

wherein the first parameter value is one of a first index number, a ratio of a transmit power of a first signal to a transmit power of a reference signal in a serving cell, or a difference between the transmit power of the first signal and the transmit power of the reference signal in the serving cell; and wherein the second parameter value is one of a second index number, a ratio of a transmit power of a first signal to a transmit power of a reference signal in an adjacent cell, or a difference between the transmit power of the first signal and the transmit power of the reference signal in the adjacent cell.

12. The communication apparatus according to claim 11, wherein the first signal and the reference signal are signals of the serving cell.

13. The communication apparatus according to claim 12, wherein the instructions to cause the transmitter to send the first indication information to the terminal device include instructions to:

cause the transmitter to send the first indication information to the terminal device according to a system message.

14. The communication apparatus according to claim 11, wherein the first signal and the reference signal are signals of an adjacent cell.

15. The communication apparatus according to claim 14, the instructions to cause the transmitter to send the first indication information to the terminal device include instructions to:
cause the transmitter to send the first indication information to the terminal device according to a system message that is at least one of a system information block (SIB) 4 or a SIB 5.

16. A communication apparatus, comprising:
a receiver;
a processor; and
a non-transitory computer-readable storage medium storing a program to be executed by the processor, the program including instructions to:
receive, though the receiver, first indication information sent by a network device, wherein the first indication information indicates a magnitude relationship between a transmit power of a first signal received at the communication apparatus and a transmit power of a reference signal received at the communication apparatus, wherein the communications apparatus is a terminal of a narrowband internet of things (NB-IoT) system, and wherein the reference signal is a narrowband reference signal (NRS), wherein the first signal is a secondary synchronization signal, wherein the first signal and the reference signal are signals of one of a serving cell or an adjacent cell, and wherein the magnitude relationship is a ratio of the transmit power of the first signal to the transmit power of the reference signal; and
determine a first receive power based on the first indication information;
wherein the first indication information further includes a first parameter value and a second parameter value;
wherein the first parameter value is one of a first index number, a ratio of a transmit power of a first signal to a transmit power of a reference signal in a serving cell, or a difference between the transmit power of the first signal and the transmit power of the reference signal in the serving cell; and
wherein the second parameter is value one of a second index number, a ratio of a transmit power of a first signal to a transmit power of a reference signal in an adjacent cell, or a difference between the transmit power of the first signal and the transmit power of the reference signal in the adjacent cell.

17. The communication apparatus according to claim 16, wherein the first signal and the reference signal are signals of the serving cell.

18. The communication apparatus according to claim 17, wherein the instructions to receive the first indication information include instructions to:
receive the first indication information sent by the network device according to a system message.

19. The communication apparatus according to claim 16, wherein the first signal and the reference signal are signals of an adjacent cell.

20. The communication apparatus according to claim 19, wherein the instructions to receive the first indication information include instructions to:
receive the first indication information sent by the network device according to a system message that is at least one of a system information block (SIB) 4 or a SIB 5.

* * * * *